(12) United States Patent  
Graber et al.

(10) Patent No.: US 8,240,463 B2  
(45) Date of Patent: Aug. 14, 2012

(54) CONVEYOR BELT WITH VARYING FLEXIBILITY AND METHOD OF CONSTRUCTION OF SAME

(75) Inventors: Terry Dean Graber, Plain City, OH (US); Wesley James Billups, Topeka, KS (US)

(73) Assignee: Veyance Technologies, Inc., Fairlawn, OH (US)

( * ) Notice: Subject to any disclaimer, the term of this patent is extended or adjusted under 35 U.S.C. 154(b) by 31 days.

(21) Appl. No.: 12/899,277

(22) Filed: Oct. 6, 2010

(65) Prior Publication Data

US 2011/0083945 A1  Apr. 14, 2011

Related U.S. Application Data

(60) Provisional application No. 61/250,462, filed on Oct. 9, 2009.

(51) Int. Cl.  
*B65G 15/34* (2006.01)

(52) U.S. Cl. ......................................... 198/847; 198/819

(58) Field of Classification Search .................. 198/819, 198/820, 821, 846, 847  
See application file for complete search history.

(56) References Cited

U.S. PATENT DOCUMENTS

| | | | |
|---|---|---|---|
| 2,633,227 A | | 8/1948 | Hutchins |
| 2,998,121 A * | | 8/1961 | Gilbert .......................... 198/847 |
| 3,615,152 A * | | 10/1971 | Bouzat et al. ................. 198/847 |
| 5,004,098 A * | | 4/1991 | Marshall ....................... 198/847 |
| 5,107,983 A * | | 4/1992 | Tschantz ....................... 198/819 |
| 5,836,440 A * | | 11/1998 | Mindich ........................ 198/819 |
| 6,092,645 A * | | 7/2000 | Wahren ......................... 198/847 |
| 7,060,341 B2 * | | 6/2006 | Mima et al. ................... 428/162 |
| 2011/0114455 A1 * | | 5/2011 | Boursier ........................ 198/832 |

FOREIGN PATENT DOCUMENTS

| | | |
|---|---|---|
| DE | 963 407 e | 5/1957 |
| DE | 39 10 911 A1 | 10/1989 |
| DE | 39 12 313 A1 | 12/1990 |
| EP | 0 050 962 A1 | 5/1982 |
| GB | 912 985 A | 12/1962 |
| JP | 60 144209 A | 7/1985 |

* cited by examiner

*Primary Examiner* — James R Bidwell  
(74) *Attorney, Agent, or Firm* — Kathleen K. Bowen; Alvin T. Rockhill

(57) ABSTRACT

A conveyor belt having a width and a length, and a longitudinal centerline, also has a first longitudinal edge, and an opposing second longitudinal edge and a load bearing region. The load bearing region is located evenly about the belt longitudinal centerline, throughout the length of the belt. The conveyor belt also has a first flexibility region and a second flexibility region, wherein the first flexibility region is located between the first longitudinal edge and the load bearing region, and the second flexibility region is located between the second longitudinal edge and the load bearing region. The conveyor belt further comprises at least one fabric layer, having a width corresponding to the conveyor belt width, and having a length corresponding to the conveyor belt length, wherein the fabric layer has a density which varies over the fabric layer width; and wherein the fabric layer density is higher in the first and second longitudinal edges and the load bearing region than the fabric layer density in the first and second flexibility region.

18 Claims, 5 Drawing Sheets

CONVEYOR BELT WITH VARYING FLEXIBILITY AND METHOD OF CONSTRUCTION OF SAME

CROSS REFERENCE TO RELATED APPLICATIONS

This application claims the benefit of U.S. Provisional Application No. 61/250,462, filed Oct. 9, 2009.

BACKGROUND

The present invention is in the field of conveyor belts. More specifically this invention relates to conveyor belts where flexibility is a concern over the width of the conveyor belt, and may be of specific use for the type of pipe conveyor belts wherein the edges overlap when the belt pipe is formed.

With tube conveyors, also referred to as hose-type belt conveyors, or pipe conveyors, mechanical means are used to form the conveyor into a closed tube in the conveying zone. The conveying zone is the area downstream of the loading area, and upstream of the discharge area. Difficulties arise in use for these types of conveyors in regards to keeping these belts closed throughout use. Prior art has steel cords or other reinforcements such as fabric running throughout the belt. Flexibility is thus an issue such that the belt needs to bend enough that there is overlap for a seal.

In other types of conveyor belts, flexibility in the widthwise direction can also be an issue in order to keep the material in the conveyor belt, and the conveyor belt in position over the length of the belt.

A method of conveyor belt construction is desired which would allow for zone specific flexibility variations over the width of the belt, while keeping manufacture easy and minimizing expense. This construction should still allow for a good seal on a tube-type conveyor belt. Further, a tubular conveyor belt is desired which would resist buckling during horizontal or vertical curves.

SUMMARY

A conveyor belt having a width and a length, and a longitudinal centerline, also has a first longitudinal edge, and an opposing second longitudinal edge and a load bearing region. The load bearing region is located evenly about the belt longitudinal centerline, throughout the length of the belt. The conveyor belt also has a first flexibility region and a second flexibility region, wherein the first flexibility region is located between the first longitudinal edge and the load bearing region, and the second flexibility region is located between the second longitudinal edge and the load bearing region. The conveyor belt further comprises at least one fabric layer, having a width corresponding to the conveyor belt width, and having a length corresponding to the conveyor belt length, wherein the fabric layer has a density which varies over the fabric layer width; and wherein the fabric layer density is higher in the first and second longitudinal edges and the load bearing region than the fabric layer density in the first and second flexibility region.

DETAILED DESCRIPTION

Figure 1:
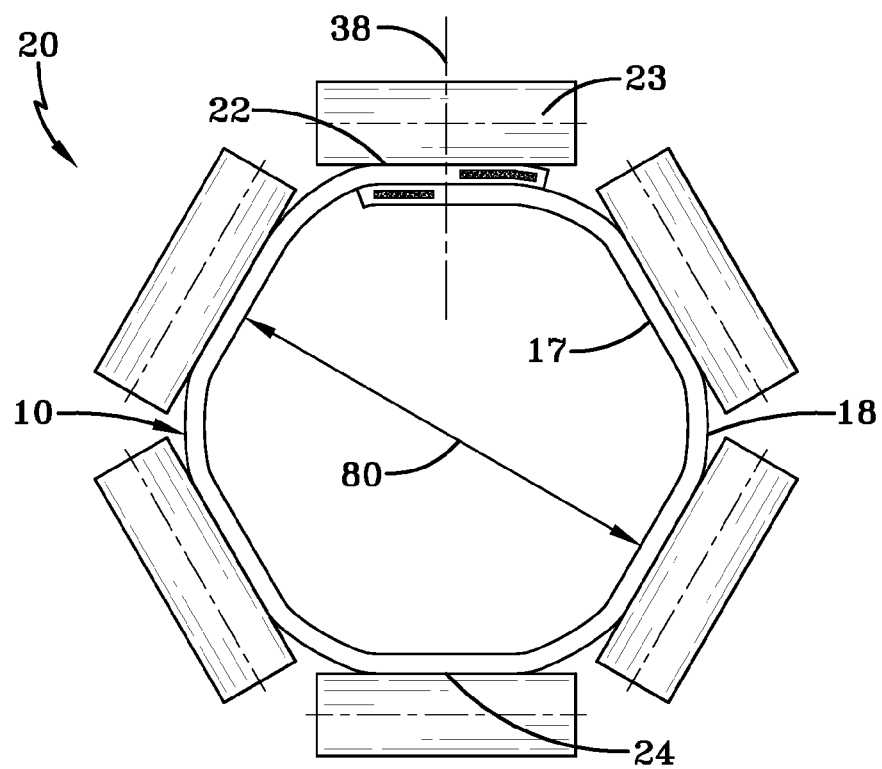
FIG. 1 is a cross sectional view of a tubular conveyor belt assembly according to an aspect of the invention.
Figure 2:
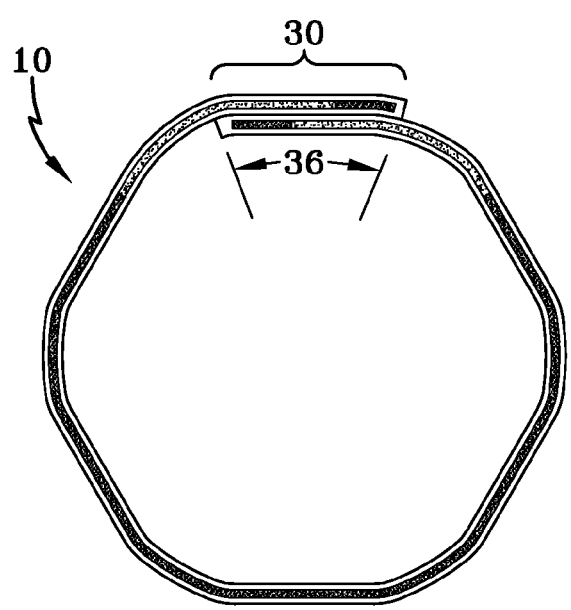
FIG. 2 is a cross sectional view of a tubular conveyor belt according to an aspect of the invention.
Figure 3:
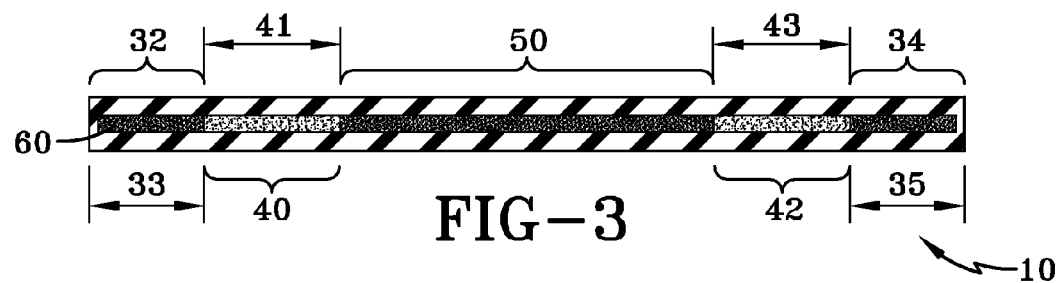
FIG. 3 is a cross sectional view of a conveyor belt according to an aspect of the invention.
Figure 4:
FIG. 4 is a cross sectional view of a conveyor belt according to an aspect of the invention.
Figure 5:
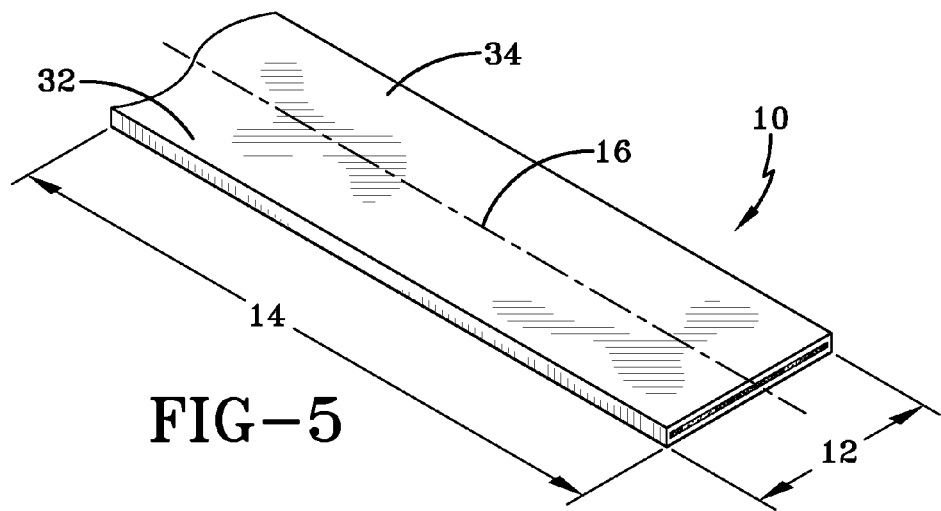
FIG. 5 is an isometric view of a tubular conveyor belt according to an aspect of the invention.
Figure 6:
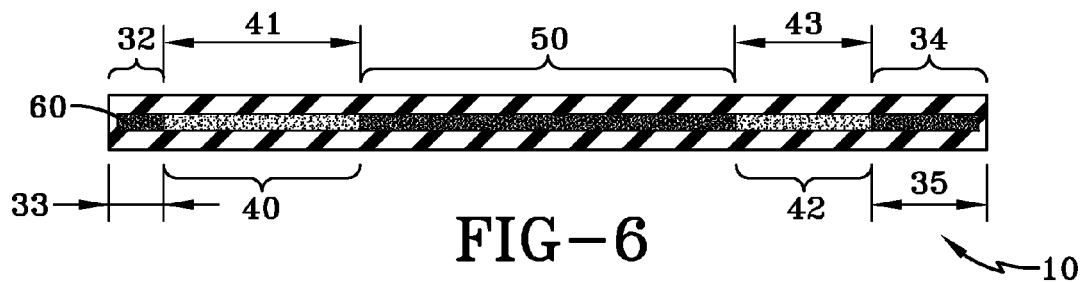
FIG. 6 is a cross sectional view of a conveyor belt according to an aspect of the invention.
Figure 7:
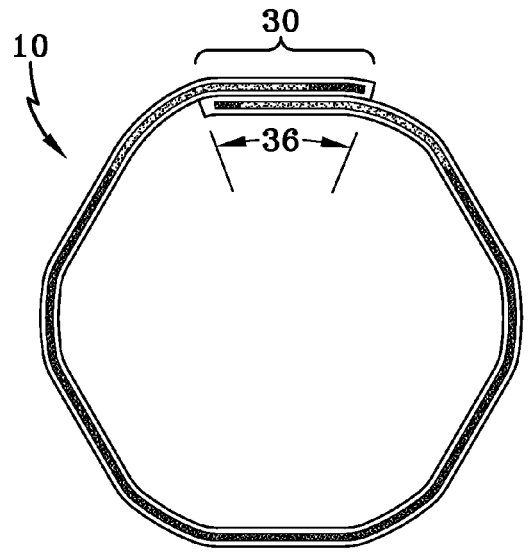
FIG. 7 is a cross sectional view of a tubular conveyor belt according to an aspect of the invention.
Figures 8, 9:
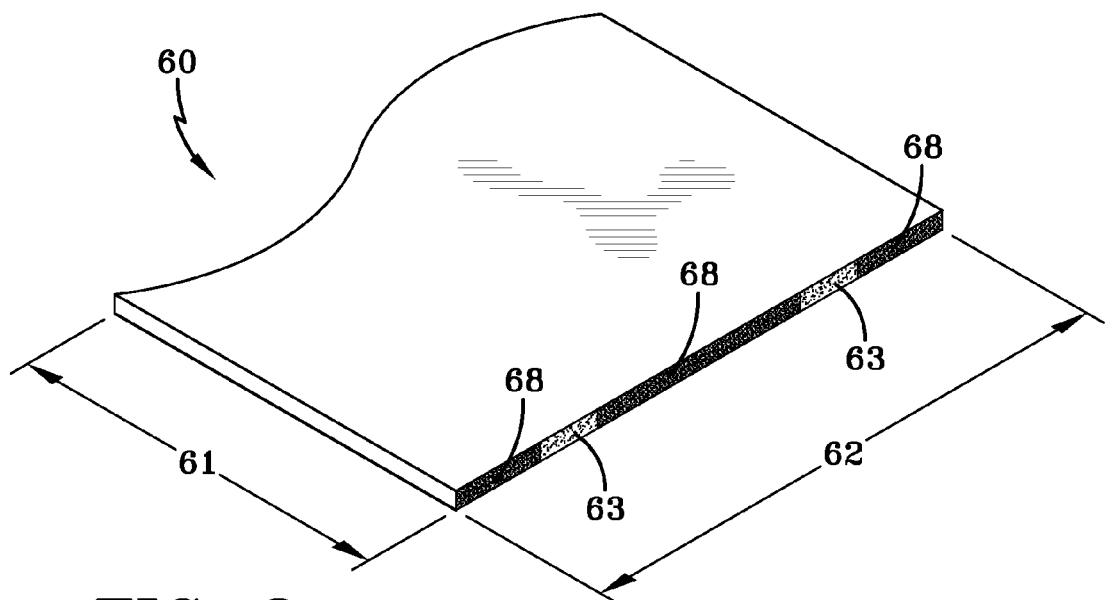
FIG. 8 is a cross sectional view of a fabric layer with varying densities according to an aspect of the invention.
FIG. 9 are samples of textile specifications according to an aspect of the invention.
Figure 10:
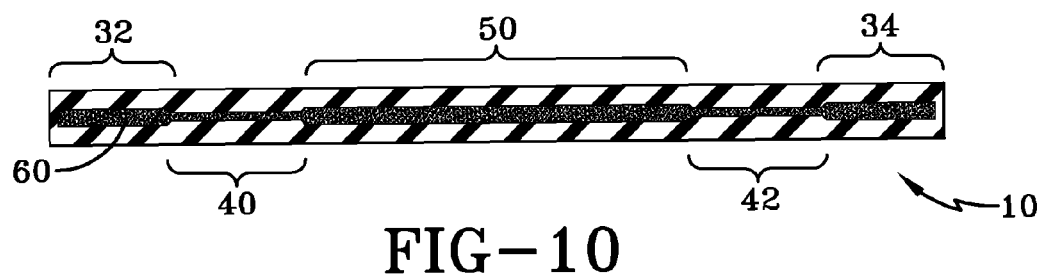
FIG. 10 is a cross sectional view of a conveyor belt according to an aspect of the invention.
Figure 11:
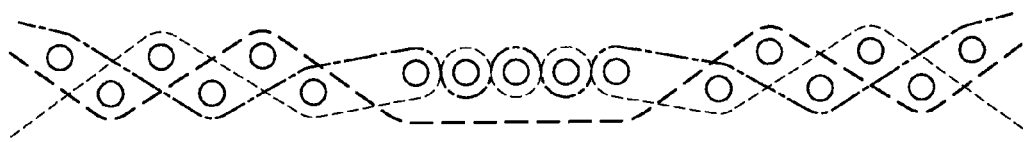
FIG. 11 is a magnified detail view of a cross section of fabric according to an aspect of the invention.
Figure 12:
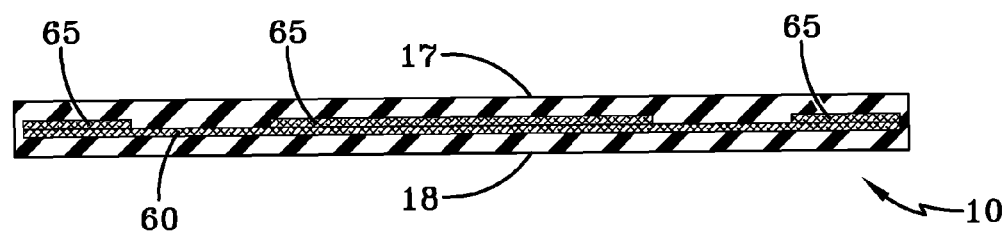
FIG. 12 is a cross sectional view of a conveyor belt according to an aspect of the invention.

Various aspects of the invention are presented in FIGS. 1-12 which are not drawn to scale and in which like components are numbered alike. According to an aspect of the invention, a conveyor belt 10 for use in a conveyor belt system 20 has a width 12 and a length 14, and a longitudinal centerline 16.

The conveyor belt width 12 is comprised of four regions; an overlap region 30, a first flexibility region 40, a second flexibility region 42, and a load bearing region 50. The conveyor belt 10 has a first longitudinal edge 32, and an opposing second longitudinal edge 34, wherein during use, the first longitudinal edge 32 and the second longitudinal edge 34 overlap to form the overlap region 30, thus forming the belt 10 into a tube-like shape. The conveyor belt further has at least one fabric layer 60.

According to an aspect of the invention, the fabric layer 60 has a length 61 which corresponds to the belt length 14 and a width 62 which corresponds to the belt width 12. The fabric layer has a density which varies along the width 62 of the belt.

The load bearing region 50 is located evenly about the belt longitudinal centerline 16, throughout the length of the belt.

The first flexibility region 40 is located between the first longitudinal edge 32 and the load bearing region 50, and the second flexibility region 42 is located between the second longitudinal edge 34 and the load bearing region 50.

According to an aspect of the invention, the fabric layer 60 density is higher (higher density areas 68) in the first and second longitudinal edges 32/34, and the load bearing region 50, than the fabric layer 60 density (lower density areas 63) in the first and second flexibility regions 40/42.

According to an aspect of the invention, the first flexibility region 40 and the second flexibility region 42 are evenly distributed about the belt longitudinal centerline 16.

The first flexibility region 40 and the second flexibility region 42 each have a width corresponding in direction to the belt width, and wherein the first flexibility region width 41 is approximately equal to the second flexibility region width 43.

According to another embodiment, the first flexibility region width 41 is different than the second flexibility region width 43.

The first longitudinal edge 32 and the second longitudinal edge 34 each have a width corresponding in direction to the belt width, wherein the first longitudinal edge width 33 is approximately equal to the second longitudinal edge width

35. According to another aspect of the invention, the first longitudinal edge width 33 is different than the second longitudinal edge width 35.

According to another aspect of the invention, the first flexibility region 40 and the second flexibility region 42 each span between 5% to 35% of the belt width 12. According to a further aspect of the invention, each flexibility region may be 10% to 30%, and in a further embodiment, each flexibility region may be 15% to 25%.

In a further aspect of the invention, the overlap region 30 has a width 36, and the overlap region width 36 is between 5% to 10% of the belt width 12. In a further embodiment of the invention, the overlap region may be between 10-20% of belt width.

In another aspect of the invention, the load bearing region 50 spans between 65% to 80% of the belt width 12. In a further embodiment of the invention, the load bearing region may span between 50% to 85% of the belt width.

Conventional conveyor belts consist of a woven reinforcing fabric embedded inside a flexible matrix of polyvinyl chloride or the like. The reinforcing fabric is woven by interlacing multiple warp yarns with multiple weft yarns. The warp yarns extend in the longitudinal or travel direction of the belt, and the weft yarns are placed at right angles to the warp yarns.

The density of the fabric layer 60 may vary due to varying weave patterns. The density of the fabric layer 60 may vary due to varying fabric ends-per-inch (epi). (see FIG. 11) Ends-per-inch (epi) refers to the number of warp threads/yarns in an inch. By varying the epi of the fabric weave across the width of the fabric, the belt structure may achieve the desired flexibility regions using the same simple construction techniques previously used.

The varying densities across the width of the belt may also be achieved by multiple layers of fabric laid in different regions. For example, there may be 1 fabric layer 60 across the entire width of the belt, and additional fabric layers 65 in only the non-flexibility regions.

The belt 10 has an inner surface 17, and an outer surface 18, and in a further aspect of the invention the belt 10 comprises an outer fabric reinforcement layer 70 on the outer surface 18. In one embodiment of the invention, the outer fabric reinforcement layer 70 covers the overlap region 30, the first and second flexibility regions 40/42, and the load bearing region 50. In a further embodiment, when the diameter 80 of the belt as formed is equal to or less than 250 mm, the outer fabric reinforcement layer 70 covers the first and second flexibility regions 40/42, and the load bearing region 50, but does not cover the overlap region 30. In a further embodiment, when the diameter 80 of the belt as formed is equal to or less than 250 mm, the outer fabric reinforcement layer 70 partially covers the first and second flexibility regions 40/42, and covers the load bearing region 50, but does not cover the overlap region 30.

In a further aspect of the invention, when the diameter 80 is greater than 250 mm, the belt 10 further comprises an inner fabric reinforcement layer 72 on the inner surface 17, wherein the inner fabric reinforcement layer 72 covers the first and second flexibility regions 40/42, and the load bearing region 50. In a further aspect of the invention, when the diameter 80 is greater than 250 mm, the belt 10 further comprises an inner fabric reinforcement layer 72 on the inner surface 17, wherein the inner fabric reinforcement layer 72 partially covers the first and second flexibility regions 40/42, and covers the load bearing region 50. The amount of coverage of the fabric reinforcement layers 70 and/or 72 may be adjusted on a case by case basis to adjust the overall stiffness of the belt to accommodate various operating conditions, such as the ultimate diameter 80 of the tube-like shape, and/or the number and tightness of the bends in the conveying system.

According to an aspect of the invention, the fabric layer density in the first longitudinal edge 32 and the second longitudinal edge 34 are equal in density and width. According to a further aspect of the invention, the fabric layer density in the first longitudinal edge 32 and the second longitudinal edge 34 are not equal in density or width.

This invention has been described in relation to the construction of a tubular conveyor belt; however, this invention may be applied to other conveyor belts as well. In any conveyor belt where the flexibility in the width-wise direction is a concern, the fabric described above (varying densities due to weave pattern of epi across the width of the fabric) may be designed and used to simplify construction of such belts. Previously there would be many more steps in the manufacture, such as layering many different sized fabrics throughout construction. This was not only more labor intensive, but also could result in reduced quality, as the layers could shift along the length of the belt. This shift might then cause the flexible regions to shift, and thus cause the belt to wear improperly, or to shift out of alignment along the belt path.

We claim:

1. A conveyor belt wherein said conveyor belt has a width and a length, and a longitudinal centerline, comprising:
    a first longitudinal edge, and an opposing second longitudinal edge;
    a load bearing region, wherein said load bearing region is located evenly about the belt longitudinal centerline, throughout the length of the belt;
    a first flexibility region and a second flexibility region, wherein said first flexibility region is located between said first longitudinal edge and said load bearing region, and said second flexibility region is located between said second longitudinal edge and said load bearing region;
    at least one fabric layer, having a width corresponding to the conveyor belt width, and having a length corresponding to the conveyor belt length, wherein said fabric layer has a density which varies over said fabric layer width; and
    wherein said fabric layer density is higher in said first and second longitudinal edges and said load bearing region than said fabric layer density in said first and second flexibility region.

2. The conveyor belt of claim 1 wherein said first flexibility region and said second flexibility region are evenly distributed about the belt longitudinal centerline.

3. The conveyor belt of claim 1 wherein said first flexibility region and said second flexibility region each have a width corresponding in direction to the belt width, and wherein the first flexibility region width is approximately equal to the second flexibility region width.

4. The conveyor belt of claim 1 wherein said first flexibility legion and said second flexibility region each have a width corresponding in direction to the belt width, and wherein the first flexibility region width is different than the second flexibility region width.

5. The conveyor belt of claim 1 wherein said first flexibility region and said second flexibility region each have a width corresponding in direction to the belt width, and wherein each said flexibility region width is between 5% to 35% of the belt width.

6. The conveyor belt of claim 1 wherein said first flexibility region and said second flexibility region each have a width corresponding in direction to the belt width, and wherein each said flexibility region width is between 10% to 30% of the belt width.

7. The conveyor belt of claim 1 wherein said first flexibility region and said second flexibility region each have a width corresponding in direction to the belt width, and wherein each said flexibility region width is between 15% to 25% of the belt width.

8. The conveyor belt of claim 1 wherein said first longitudinal edge and said second longitudinal edge each have a width corresponding in direction to the belt width, wherein said first longitudinal edge width is approximately equal to the second longitudinal edge width.

9. The conveyor belt of claim 1 wherein said first longitudinal edge and said second longitudinal edge each have a width corresponding in direction to the belt width, wherein said first longitudinal edge width is different than the second longitudinal edge width.

10. The conveyor belt of claim 1 further comprising an overlap region, wherein during use, said first longitudinal edge and said second longitudinal edge overlap to form said overlap region, thus forming the belt into a tube-like shape.

11. The conveyor belt of claim 10 wherein said overlap region has a width, and said overlap region width is between 5% to 10% of the bell width.

12. The conveyor belt of claim 10 wherein said overlap region has a width, and said overlap region width is between 10% to 20% of the belt width.

13. The conveyor belt of claim 1 wherein said load bearing region has a width, corresponding in direction to the belt width, wherein said load bearing region width is between 65% to 80% of the belt width.

14. The conveyor belt of claim 1 wherein said load bearing region has a width, corresponding in direction to the belt width, wherein said load bearing region width is between 50% to 85% of the belt width.

15. A method of constructing a conveyor belt having a length and a width, and further having at least one region of higher flexibility and at least one region of lower flexibility varying across the width of the conveyor belt, the method comprising;
    weaving a fabric having a length and a width corresponding to the conveyor belt length and width, with a weave pattern such that said fabric has at least one region of higher density corresponding to the conveyor belt lower flexibility region, and one region of lower density corresponding to the conveyor belt higher flexibility region; and,
    constructing the conveyor belt using standard materials, and said fabric as a fabric layer.

16. The method of claim 15 wherein said fabric density variations are achieved by varying the ends per inch across the width of the fabric.

17. The method of claim 15 wherein said fabric density variations are achieved by varying the yarn orientations or weave pattern across the width of the fabric.

18. The method of claim 15 wherein said fabric density variations are achieved by varying the size, type, or twist level of the longitudinal yarns across the width of the fabric.

* * * * *